United States Patent [19]
Hibino et al.

[11] Patent Number: 5,587,751
[45] Date of Patent: Dec. 24, 1996

[54] INFORMATION RECORDING DEVICE AND METHOD WITH FEEDING SPEED CONTROL

[75] Inventors: Hideo Hibino; Norikazu Yokonuma, both of Kanagawa-ken; Kazuyuki Kazami, Tokyo-to; Youichi Yamazaki, Kanagawa-ken, all of Japan

[73] Assignee: Nikon Corporation, Tokyo, Japan

[21] Appl. No.: 529,993

[22] Filed: Sep. 19, 1995

[30] Foreign Application Priority Data

Dec. 5, 1994 [JP] Japan ................ 6-300970

[51] Int. Cl.⁶ .................................. G03B 17/24
[52] U.S. Cl. ............................. 396/319; 396/310
[58] Field of Search ........................ 354/105, 106, 354/173.1, 173.11, 212, 215; 360/73.01, 73.04, 73.05, 73.06, 73.08

[56] References Cited

U.S. PATENT DOCUMENTS 5,504,546  4/1996  Kazami et al. ................ 354/106

FOREIGN PATENT DOCUMENTS

4-328536  11/1992  Japan.

*Primary Examiner*—Howard B. Blankenship
*Attorney, Agent, or Firm*—Oliff & Berridge

[57] ABSTRACT

An information recording device of a camera permits recording of more photographic information with an appropriate recording density without monitoring the film feeding speed constantly. The information recording device includes a recording assembly that records photographic information on a film recording area of film during film feeding. A feeding speed control assembly reduces the film feeding speed at a first time if the recording of photographic information is complete by the first time after the start of the recording assembly. The feeding speed control assembly reduces the film feeding speed at a second time after the first time if recording of the photographic information is not complete after reaching the first time. The feeding speed control assembly controls the feeding assembly to stop film feeding at a third time after reducing the film feeding speed. A recording control assembly allows information recording by the recording assembly during film feeding time until the film feeding speed is reduced.

40 Claims, 5 Drawing Sheets

FIG.8

INFORMATION RECORDING DEVICE AND METHOD WITH FEEDING SPEED CONTROL

BACKGROUND OF THE INVENTION

1. Field of the Invention

The present invention relates to an information recording device capable of recording information on a recording medium such as, for example, on a film during a film feeding operation for use, for example, in a camera.

2. Discussion of Related Art

Cameras capable of recording photographic data such as, for example, the photograph date or the exposure values, on each photographic frame of film on a magnetic recording medium coated on the film are known. In these cameras, a film feeding motor begins winding of one frame of film upon completion of a photographing operation for an arbitrary frame. The recording photographic information by a magnetic head begins after stabilization of the film feeding speed. The information recording operation is completed before the film is wound the equivalent of one frame, and the film feeding speed is reduced by duty-driving the film feeding motor. Upon completion of winding the film the equivalent of one frame, the film feeding speed is reduced. Performing information recording only during stabilization of the film feeding speed in this manner prevents reading errors during information retrieval by making the recording density approximately uniform.

However, performing information recording only when the feeding speed is stabilized limits the amount of photographic information that can be recorded. To record more information, it is necessary to increase the frequency of the recording signals. However, increasing the recording signal frequency raises the recording density when the film feeding speed is relatively low, which causes frequent reading errors.

A method can be adopted in which the frequency of the recording signals is changed appropriately according to the amount of information to be recorded and the feeding speed while monitoring the film feeding speed that permits recording of more information with an appropriate recording density. However, the film feeding speed is not always uniform, due to temperature and the battery capacity, and the feeding velocity must always be monitored during film feeding if the above method is adopted. This requires a feeding speed monitoring device such as a pulse film encoder, causing an increase in cost.

SUMMARY OF THE INVENTION

An object of the present invention is to overcome the above problems by providing an information recording device capable of recording more information with an appropriate recording density without always monitoring the recording medium feeding speed.

This and other objects of the invention are achieved by providing an information recording device for use, for example, in a camera that permits the recording of more information on a recording medium without constantly monitoring the feeding speed. The information recording device includes a feeding assembly that feeds the film within the camera at a film feeding speed during a film feeding operation. An information recording assembly records information on the information recording area during the film feeding operation. The information recording assembly may include a magnetic head to record the photographic information in the information recording area of the film.

A controller determines whether information recording by the information recording assembly is completed before a first timing. A film feeding speed controller is connected to the film feeding assembly and controls the film feeding assembly. The film feeding speed controller controls the feeding assembly to reduce the film feeding speed at the first timing when the controller determines that information recording is complete. The film feeding speed is reduced at a second timing after the first timing when the controller determines that information recording is not complete at the first timing. The film feeding speed controller further controls the film feeding assembly to stop film feeding at a third timing after the film feeding speed has been reduced. The feeding assembly may include a power driving source for film feeding such that the film feeding speed controller reduces the film feeding speed by duty-driving the power driving source.

The film feeding speed controller controls the film feeding assembly to begin feeding a first frame of the film after completion of an exposure operation by the camera. The film feeding speed controller controls the feeding assembly to stop film feeding when a film feeding amount reaches an equivalent of one frame of film.

A recording controller is connected to the information recording assembly and controls the information recording assembly. The recording controller controls the information recording assembly such that information recording begins after a stabilized film feeding speed is detected. The recording controller controls the information recording assembly to permit information recording until the film feeding speed is reduced.

The information recording assembly may include a transformation unit that transforms the photographic information to be recorded to recording signals having a predetermined frequency, and a recording unit that records the recording signals to the information recording area of the film. The transformation unit increases the frequency of the recording signals at the first timing when the controller determines that information recording is not complete at the first timing.

Additionally, a warning assembly may be provided that performs a warning operation when information recording is not complete at the second timing.

In accordance with another aspect of the present invention, there is provided a method of recording photographic information on a film. The method includes feeding the film at a film feeding speed through the information recording device. Photographic information is then recorded on the film after a stabilized film feeding speed is detected. The film feeding speed is reduced at a first timing when information recording is complete. The film feeding speed is reduced at a second timing after the first timing when information recording is not complete at the first timing. The film feeding is then stopped at a third timing after the film feeding speed is reduced at the first or second timings. The recording of information is stopped when the film feeding speed is reduced.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A preferred embodiment of the present invention is explained hereafter with reference to FIGS. 1–8.

Figure 1:
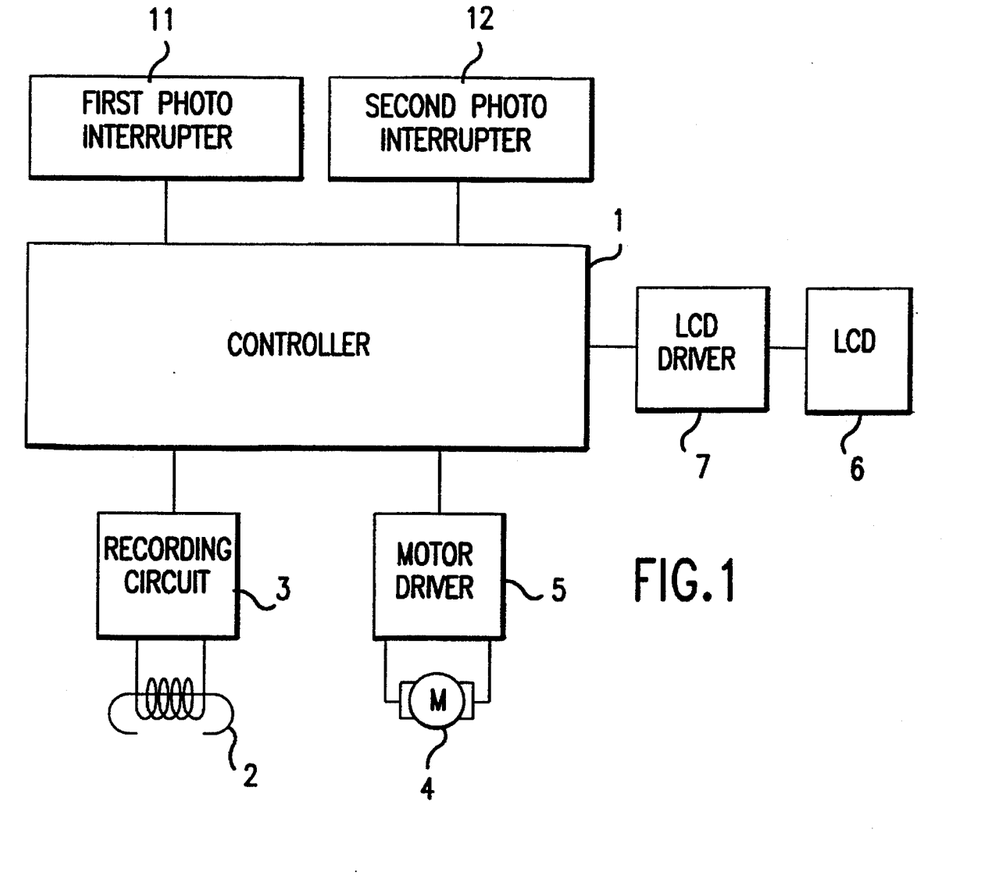
FIG. 1 is a block diagram illustrating the structure of a control system for an information recording device according to an embodiment of the present invention.
Figure 2:
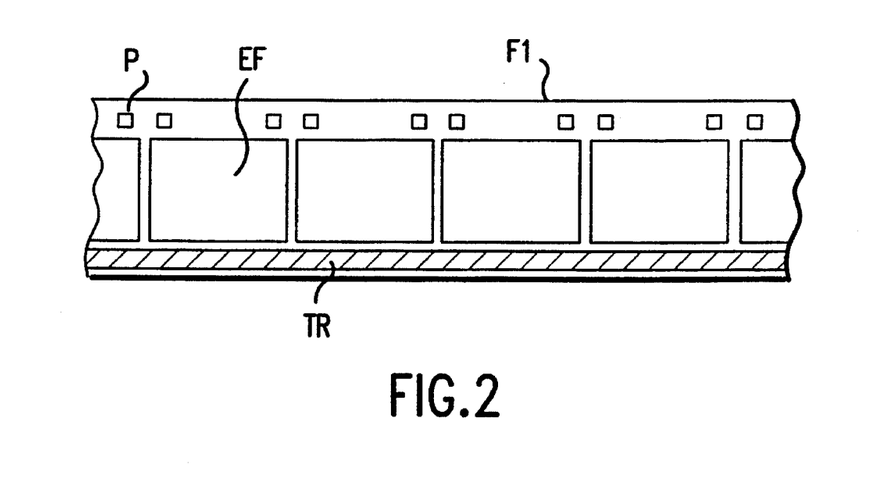
FIG. 2 illustrates the structure of the film.
Figure 3:
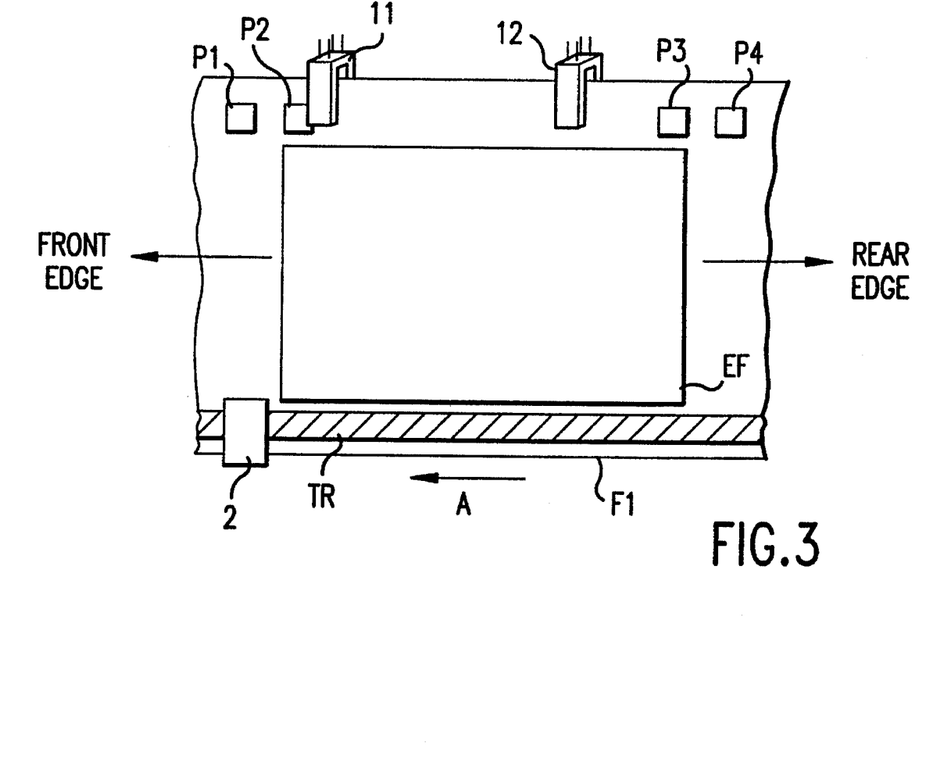
FIG. 3 illustrates the location of the photo interrupters and the magnetic head with respect to the film according to an embodiment of the present invention.

FIG. 1 is a block diagram illustrating an information recording device of a camera according to an embodiment of the present invention. The information recording device includes a controller 1. First and second perforation detection photo interrupters 11, 12 are connected to the controller 1. A recording circuit 3 records photographic information for each frame on a magnetic track TR of a film F1, as shown in FIGS. 2 and 3, by driving a magnetic head 2. The recording circuit 3 is connected to the controller 1. A motor driver 5 winds and rewinds the film F1 by driving a film feeding motor 4. The motor driver 5 is connected to the controller 1. An LCD driver 7 operates a liquid crystal display device or LCD 6. The photographic information recorded on the film F1 by the magnetic head 2 may include, for example, the photograph date, the exposure value, whether an electronic flash device operated, and a focal distance of a photographic lens assembly.

FIGS. 2 and 3 illustrate the location of the film perforations p and magnetic track TR in film F1. FIG. 3 illustrates the location of the first and the second photo interrupters 11 and 12 and the magnetic head 2 with respect to the film F1.

As illustrated in FIG. 2, the perforations P are regularly located along a length direction on an upper portion of the film F1. The film F1 includes a plurality of photographic frames EF. Four perforations P1–P4 are located in the vicinity of each frame EF of film F1. Two perforations P1 and P2 are located in the vicinity of the front edge of film F1, as shown in FIG. 3. Two perforations P3 and P4 are located in the vicinity of the rear edge of film F1, as shown in FIG. 4.

FIG. 3 illustrates the position of film F1 when a photographic frame EF is facing a camera aperture, not shown. The first and second photo interrupters 11 and 12 are known and include a light casting unit and a light receiving unit, respectively. The photo interrupters 11 and 12 are positioned to face each other and pinch the film F1. The first photo interrupter 11 detects the front side edge of the second perforation P2. The second photo interrupter 12 is positioned between the second perforation P2 and the third perforation P3, closer to the third perforation P3.

Figure 4:
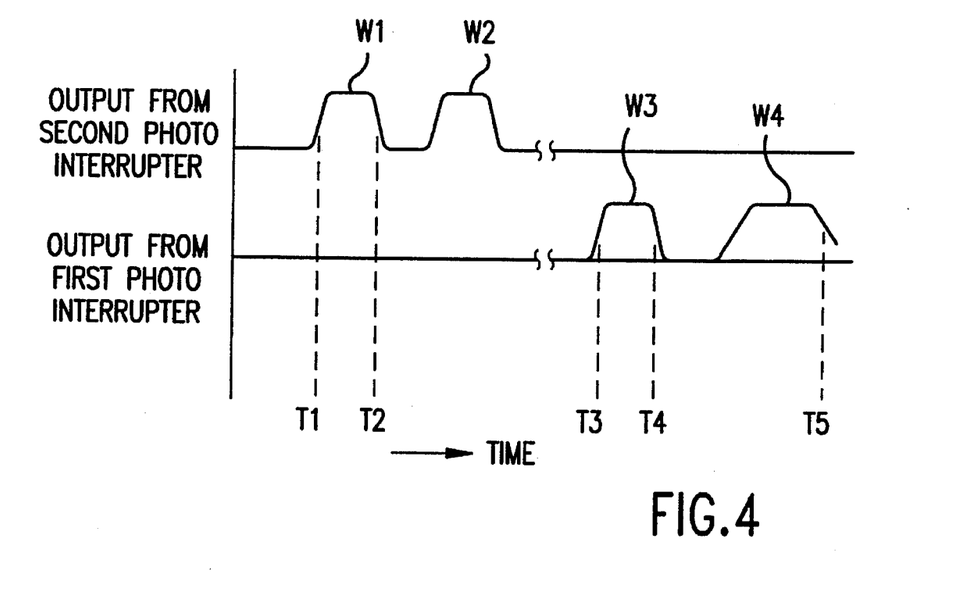
FIG. 4 illustrates the wave pattern output of the first and the second photo interrupters.

FIG. 4 illustrates the wave pattern output for the photo interrupters 11 and 12 when the film F1 is fed in the direction A, as shown in FIG. 3, the equivalent of one frame. When the film F1 is fed in the direction A, as shown in FIG. 3, the second interrupter 12 detects the third perforation P3, and the wave pattern output for the second photo interrupter changes to W1, as shown in FIG. 4. T1 and T2 represent the times at which the second photo interrupter 12 detects the front-side edge and the rear-side edge of the perforation P3, respectively. The wave pattern output changes to W2 with the detection of the fourth perforation P4 by the second photo interrupter 12.

As the film F1 advances, the first photo interrupter 11 detects the third perforation P3, and the wave pattern output for the first photo interrupter changes to W3, as shown in FIG. 4. T3 and T4 represent the times when the first photo interrupter 11 detects the front-side edge and the rear-side edge of the third perforation P3, respectively. Moreover, with the detection of the fourth perforation P4 by the first photo interrupter 11 later, the output wave pattern changes. The signal wave pattern W4 is broader than the others (i.e., W1, W2 and W3) because the film feeding speed is reduced by duty-driving the film feeding motor 4 at time T3. T5 represents the time when the first photo interrupter 11 detects the rear-side edge of the fourth perforation P4.

As shown in FIG. 3, a bottom section of the film F1 has a magnetic track TR extending in the lengthwise direction. The magnetic head 2 is able to contact the magnetic track TR and is positioned at the front-side edge section of the photographic frame EF when the photographic frame EF faces the aperture. When the film F1 is fed in direction A, the photographic information concerning the photographic frame EF is recorded on the magnetic track TR by the magnetic head 2.

In the illustrated embodiment, the controller 1 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller 1 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller 1 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flow charts shown in FIGS. 5 and 6 can be used as the controller 1. As shown, a distributed processing architecture is preferred for maximum data/signal processing capability and speed.

Figure 5:
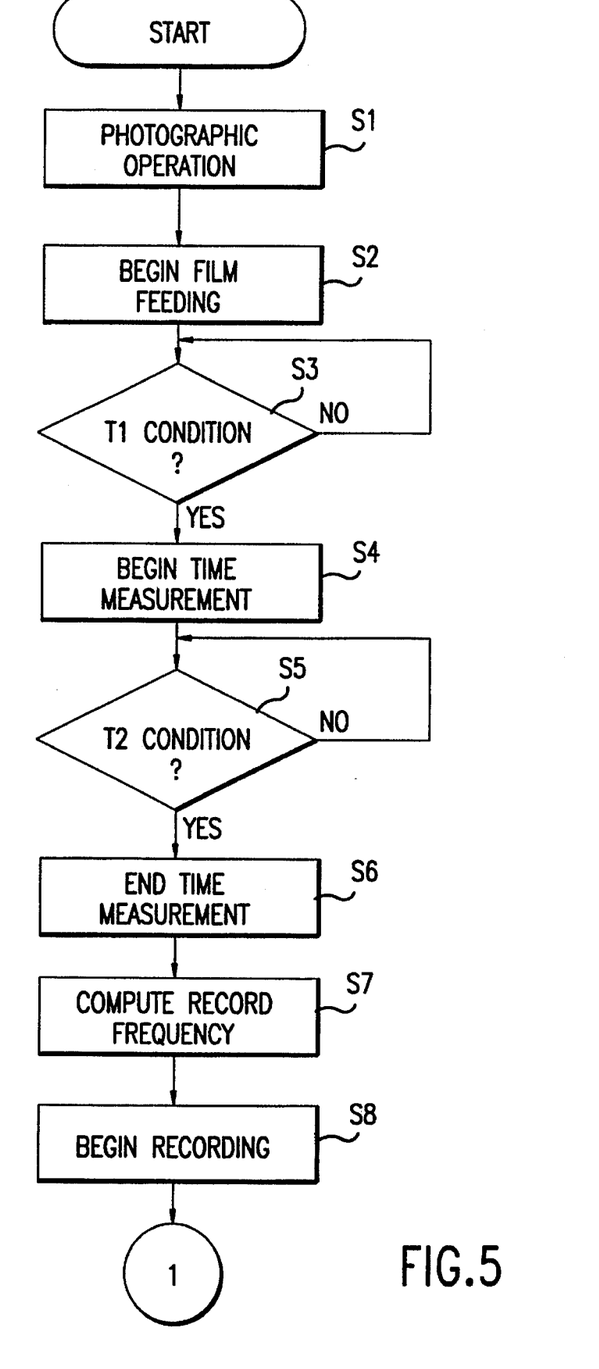
FIG. 5 is a flow chart illustrating the photographic information recording control operation.
Figure 6:
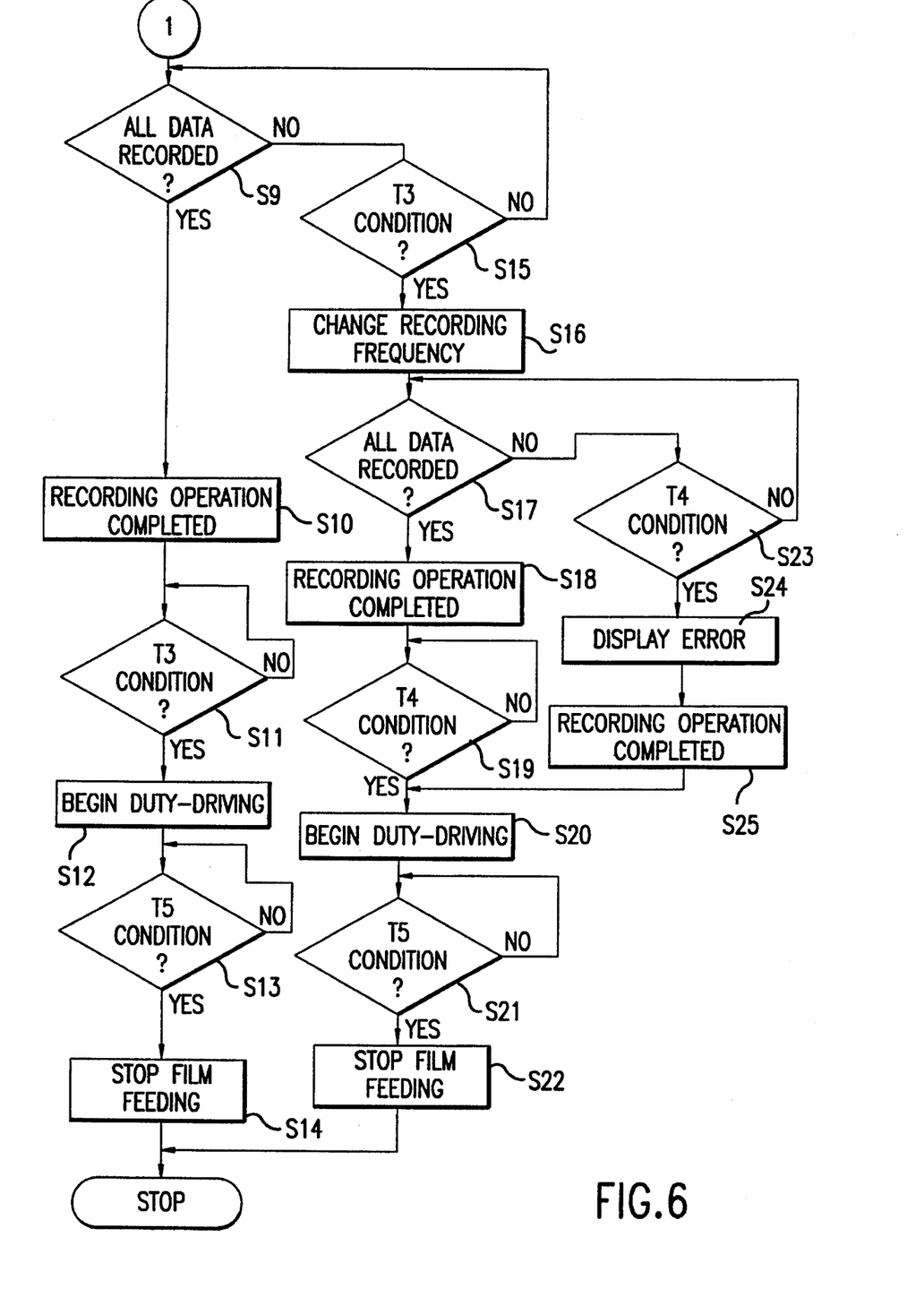
FIG. 6 is a flow chart continuing from FIG. 5.

Next, the operation of the controller 1 for magnetic recording control will be described with reference to the flow charts illustrated in FIGS. 5 and 6. The magnetic recording control operation is started in response to a shutter release operation. In step S1, a photographic operation is initially conducted. The photographic operation includes distance measurement, photometry, and shutter driving. After completion of the photographic operation, the motor driver 5 drives the film feeding motor 4 in step S2 to begin film winding. As a result, the film F1 is fed in the direction A, as shown in FIG. 3. The operation of the controller 1 proceeds to step S3. In step S3, the controller 1 determines whether the second photo interrupter 12 detects the front-side edge of the third perforation P3 (i.e., whether a condition of time T1, as shown in FIG. 4, is achieved). This may be accomplished by detecting a rise in the wave pattern output of the second photo interrupter 12.

Figure 7:
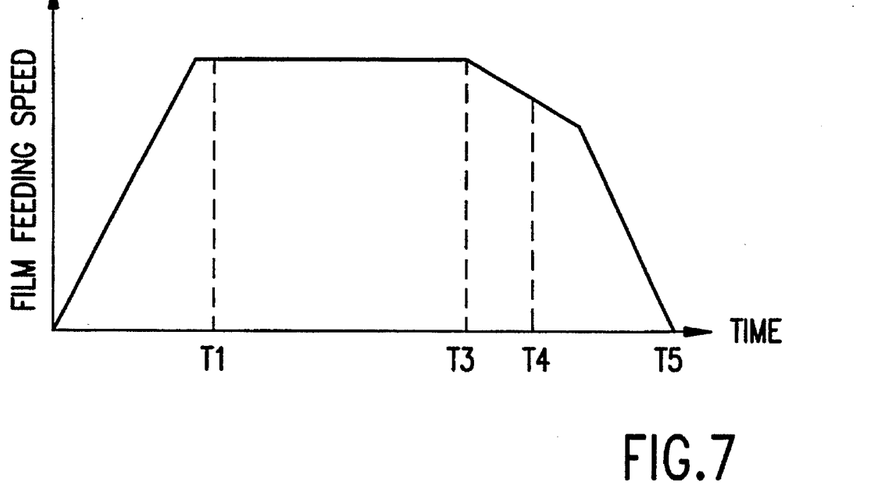
FIG. 7 illustrates the changes in the film feeding speed during normal time.

As illustrated in FIG. 7, the film feeding speed of film F1 is accelerated from the start of the driving of the film feeding motor 4. The film feeding speed is stabilized by time T1 when the controller 1 determines that the second photo interrupter 12 has detected the front-side edge of the third perforation P3 in step S3. After the front-side edge of perforation P3 is detected in step S3, the operation of the controller 1 proceeds to step S4, and time measurement begins for detecting the film feeding speed. The time measurement may be performed by a timer installed in the controller 1. In step S5, the controller 1 determines whether the second photo interrupter 12 detects the rear-side edge of the third perforation P3 (i.e., whether a condition of time T2, as shown in FIG. 4 is achieved). This may be accomplished by detecting a fall in the wave pattern output of the second photo interrupter 12. After the rear-side edge of the third perforation P3 is detected in step S5, the operation of the controller 1 proceeds to step S6 where time measurement is completed. The operation of the controller 1 then proceeds to step S7.

In step S7, the film feeding speed of the film F1 is determined based on the time period measured by the timer between the detection of the front-side edge and the rear-side edge of the third perforation P3 by the second photo interrupter 12. The recording frequency of the magnetic record signal is then established based on the film feeding speed and the amount of photographic information to be recorded. The recording frequency is established according to the film feeding speed such that the recording density on the magnetic track TR is not overly high. This permits recording of as much photographic information as possible. As a result, a faster feeding speed produces a higher cycle of recording signals.

In step S8, magnetic recording of photographic information is started. The photographic information to be recorded is transformed to recording signals with the frequency established in step S7. The recording signals are recorded on the magnetic track TR of the film F1 by the magnetic head 2 through a recording circuit 3 as the film feeding motor 4 advances the film F1. The operation of the controller 1 proceeds to step S9.

In step S9, the controller 1 determines whether the magnetic recording of all the photographic information for the current photographic frame EF is complete. In step S9 when the recording of photographic information is not complete, the operation of the controller 1 proceeds to step S15. In step S15, the controller 1 determines whether the first photo interrupter 11 detects the front-side edge of the third perforation P3 (i.e., whether a condition of time T3 is achieved, as shown in FIG. 4). If the condition at time T3 is not achieved, the operation of the controller 1 returns to step S9. In step S9, when the magnetic recording is completed before detection of the front-side edge of the third perforation P3 by the first photo interrupter 11 (i.e., before reaching T3), the operation of the controller 1 proceeds to step S10.

In step S10, the magnetic head 2 is halted and the recording operation is completed. The operation of the controller 1 proceeds to step S11. In step S11, the controller 1 waits until the front-side edge of the third perforation P3 is detected by the first photo interrupter 11. Duty-driving of the film feeding motor 4 then begins in step S12. In other words, the motor 4 is driven intermittently with a predetermined duty ratio. This duty-driving reduces the film feeding speed starting at time T3, as illustrated in FIG. 7.

In step S13, the controller 1 waits until the rear-side edge of the fourth perforation P4 (e.g., the equivalent of the second perforation of the next frame) is detected by the first photo interrupter 12. This occurs at the time T5. The duty-driving of the film feeding motor 4 is stopped, and film feeding is halted in step S14. The film F1 has been fed the equivalent of one photographic frame, and the next photographic frame faces the aperture. The magnetic recording control operation is thus complete.

Figure 8:
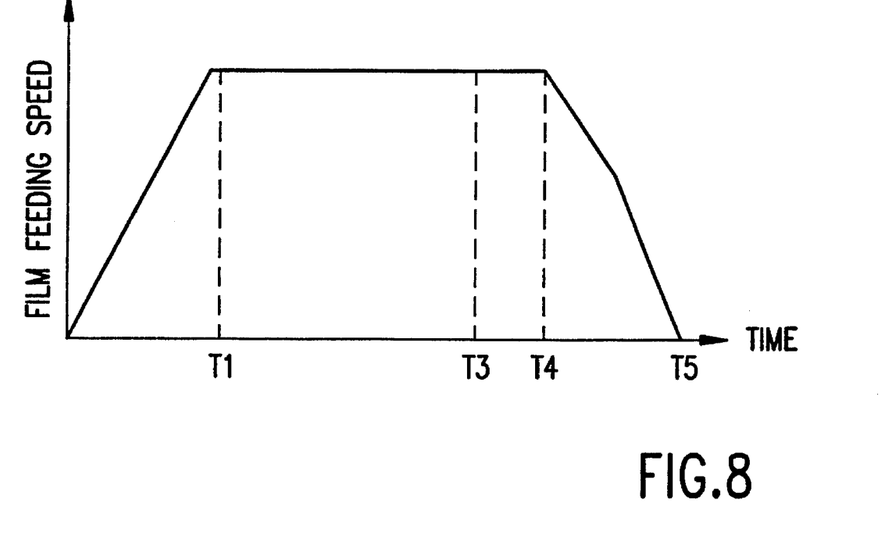
FIG. 8 illustrates the changes in the film feeding speed when there is much recording information.

When the front-side edge of the third perforation P3 is detected in step S15 by the first interrupter 11 before completion of the recording of all the photographic information, the operation of the controller 1 proceeds to step S16 without conducting duty-driving of the film feeding motor 4. The film feeding speed is not reduced after time T3, as illustrated in FIG. 8.

In step S16, the frequency of the recording signal is increased and recording of photographic information continues. Moreover, the frequency change is conducted within a range that does not affect photographic information reading. In step S17, the controller 1 determines whether all the photographic information has been recorded. If recording is not complete, the operation of the controller 1 proceeds to step S23. In step S23, the controller 1 determines whether the first photo interrupter 12 detects the rear-side edge of the third perforation P3 (i.e., whether the condition of time T4 is achieved). If the condition of time T4 is not achieved, the operation of the controller 1 returns to step S17.

When the recording of photographic information is complete in step S17 before the condition of time T4 is achieved, the recording operation is completed in step S18. In step S19, the controller 1 waits until the rear-side edge of the third perforation P3 is detected by the first photo interrupter 12 (i.e., until the condition of time T4 is achieved). Duty-driving of the film feeding motor 4 then begins in step S20. In this case, the start-up time of duty-driving is later than stated above. As a result of changing the duty ratio, the film feeding speed drops sharply. Thus, the film feeding speed falls starting at time T4, as illustrated in FIG. 8.

In step S21, the controller 1 waits until the rear side edge of the fourth perforation P4 is detected by the first photo interrupter 12 (i.e., until the condition of time T5 is achieved). Then duty-driving of the film feeding motor 4 stops, and film feeding is halted in step S22. The film F1 has been fed the equivalent of one photographic frame, and the next photographic frame faces the aperture. The magnetic recording control operation is thus complete.

In step S23, when the condition of time T4 is achieved before completion of the recording of all the photographic information, the operation of the controller 1 proceeds to step S24 where an error display or warning is sent to the LCD 6 through the LCD driver 7. The recording operation is complete in step S25. The operation of the controller 1 then proceeds.

As described above, in a present embodiment, the winding of one frame of film F1 is started after completion of an exposure of an arbitrary frame. Photographic information recording is started after a stabilized film feeding speed is detected. If recording of all the photographic information is completed before detection of the condition at time T3, the film feeding speed is reduced by duty-driving the motor 4 at time T3, after which film feeding is stopped at time T5 when the film feeding amount reaches the equivalent of one frame.

On the other hand, when the recording of photographic information is not complete after detection of the condition at time T3, information recording is allowed until time T4, which is later than time T3, as illustrated in FIG. 8. At time T4, the film feeding speed is reduced. Film feeding is halted at time T5 when the film feeding amount reaches the equivalent of one frame from the start of film feeding. In this case, the start-up time of duty-driving is later, as illustrated in FIG. 8 as compared to FIG. 7. This slightly reduces the film stop precision, but permits more photographic information to be recorded because information recording continues until time T4.

In the present embodiment, the film feeding speed is detected prior to magnetic recording, and the frequency of the recording signals is determined based on this feeding speed. As a result, more photographic information can be recorded with an appropriate recording density. Here, it is not necessary to always monitor the feeding speed during film feeding, which makes installation of a feeding speed monitor assembly, such as a pulse type film encoder, unnecessary.

In the above described embodiment, the film feeding motor 4 and the motor driver 5 form a film feeding assembly. The magnetic head 2 and the recording circuit 3 are part of a recording assembly. The LCD 6 and the LCD driver 7 are included in a warning assembly. The controller 1 includes a determination assembly that determines when recording of photographic information is complete, a feeding speed control assembly for controlling the feeding assembly, and a recording control assembly for controlling the recording assembly.

Time T3 corresponds to a first timing, and time T4 corresponds to a second timing, respectively. Here, the duty-driving of step S20 may be started immediately, without executing step S19, after a positive result for step S17 in FIG. 6 and after completion of the recording operation in step S18. In this case, the time when recording of all the photographic information is completed becomes the second timing. Moreover, in the above-described embodiment, an example is shown in which photographic information is recorded for each photographic frame, but the present invention can also be applied to a case in which information to specify, such as, for example, film type can be recorded regardless of the photographic frame. Therefore, the timing of information recording is not limited to the time of winding one frame of each photographic frame, and film loading time and the like can be used with equal success.

In the above-described embodiment, a normal winding type of camera is used for illustrative purposes, but the present invention may also be applied to a pre-winding type of camera in which film is wound to the end edge once, then the film is rewound with each photographic operation. Moreover, the film feeding speed is detected prior to information recording to determine the frequency of the recording signals, but detection of this feeding speed is not a mandatory requirement for the present invention, and recording with a constant frequency works equally well. Moreover, in step S16, the recording frequency is changed, but this is not mandatory either. Additionally, an example is used in which the film feeding speed is reduced by duty-driving the motor, but other methods to reduce speed can be used as well. Furthermore, the information recording method is not limited to magnetic recording.

If recording of all the information is completed before reaching the first timing after the starting of photographic information recording, information recording is allowed until the first timing when the film feeding speed is reduced. When recording of all the information is not completed after reaching the first timing, information recording is permitted until a second timing that is later than the first timing. Hence, recording of more information with an appropriate recording density is possible without requiring a feeding speed monitor, such as, a pulse type film encoder.

By providing a warning or error display when recording of all the information is not completed especially after reaching the second timing mentioned above, when all the information is unable to be recorded, the photographer can be notified of the situation. If it is determined that recording of all the information is not completed even after reaching the first timing, even more information can be recorded by increasing the frequency of the recording signals.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. An information recording device for use in a camera for recording photographic information on a film having an information recording area, the information recording device comprising:

a film feeding assembly that feeds the film within the camera at a film feeding speed during a film feeding operation;

an information recording assembly that records information on the information recording area during the film feeding operation;

a controller that determines whether information recording by said information recording assembly is complete before a first timing;

a film feeding speed controller connected to said film feeding assembly that controls said film feeding assembly to reduce the film feeding speed at the first timing when said controller determines that information recording is complete, said film feeding speed controller further controls said film feeding assembly to reduce the film feeding speed at a second timing after the first timing when said controller determines that information recording is not complete at the first timing, and wherein said film feeding speed controller further controls said film feeding assembly to stop film feeding at a third timing after the film feeding speed has been reduced; and a recording controller connected to said information recording assembly that controls said information recording assembly.

2. The information recording device according to claim 1, wherein said recording controller controls said information recording assembly such that information recording begins after a stabilized film feeding speed is detected.

3. The information recording device according to claim 1, wherein said recording controller controls said information recording assembly to permit information recording until the film feeding speed is reduced during the film feeding operation.

4. The information recording device according to claim 1, wherein said feeding assembly includes a power driving source for film feeding, and wherein said film feeding speed controller reduces the film feeding speed by duty-driving said power driving source.

5. The information recording device according to claim 1, further comprising a warning assembly that performs a warning operation when information recording is not complete at the second timing.

6. The information recording device according to claim 1, wherein said information recording assembly includes:

a transformation unit that transforms the photographic information to be recorded to recording signals having a predetermined frequency; and a recording unit that records the recording signals to the information recording area of the film.

7. The information recording device according to claim 6, wherein said transformation unit increases the frequency of the recording signals at the first timing when said controller determines that information recording is not complete at the first timing.

8. The information recording device according to claim 1, wherein said film feeding speed controller controls said film feeding assembly to begin feeding a frame of the film after completion of an exposure operation by the camera.

9. The information recording device according to claim 1, wherein said film feeding speed controller controls said feeding assembly to stop film feeding when a film feeding amount reaches an equivalent of one frame of film.

10. The information recording device according to claim 1, wherein said information recording assembly includes a magnetic head to record the photographic information in the information recording area of the film.

11. An information recording device for use in a camera for recording photographic information on film having an information recording area, the information recording device comprising:

feeding means for feeding the film within the camera at a film feeding speed during a film feeding operation;

recording means for recording information on the information recording area during the film feeding operation;

determination means for determining whether information recording by said recording means is complete before a first timing;

feeding speed control means for controlling said feeding means to reduce the film feeding speed at the first timing when said determination means determines that information recording is complete, said feeding speed control means further controlling said feeding means to reduce the film feeding speed at a second timing after the first timing when said determination means determines that information recording is not complete at the first timing, and wherein said feeding speed control means further controls said feeding means to stop film feeding at a third timing after the film feeding speed has been reduced; and recording control means for controlling the operation of said recording means.

12. The information recording device according to claim 11, wherein said recording control means controls said recording means to begin information recording after film feeding is started and a film feeding speed is detected.

13. The information recording device according to claim 11, wherein said recording control means controls said recording means to permit information recording until the film feeding speed is reduced by said film feeding speed control means during the film feeding operation.

14. The information recording device according to claim 11, further comprising warning means for performing a warning operation when information recording is not complete at the second timing.

15. The information recording device according to claim 11, wherein said feeding speed control means controls said feeding means to begin film feeding of a frame of the film upon completion of an exposure operation by the camera.

16. The information recording device according to claim 11, wherein said feeding control means controls said feeding means to stop film feeding when a film feeding amount reaches the equivalent of one frame of film.

17. An information recording device for recording information on a recording medium, comprising:

feeding means for feeding the recording medium through the information recording device at a feeding speed during a feeding operation;

recording means for recording information on the recording medium during the feeding operation;

determination means for determining whether information recording by said recording means is complete before a first timing;

feeding speed control means for controlling said feeding means to reduce the feeding speed of the recording medium at the first timing when said determination means determines that information recording is complete, said feeding speed control means further controlling said feeding means to reduce the feeding speed at a second timing after the first timing when said determination means determines that information recording is not complete at the first timing, wherein said feeding speed control means further controls said feeding means to stop feeding at a third timing after the feeding speed has been reduced; and recording control means for controlling said recording means.

18. The information recording device according to claim 17, wherein said recording control means controls said recording means such that information recording is started after a stabilized feeding speed of the recording medium is detected.

19. The information recording device according to claim 17, wherein said recording control means controls said recording means to permit information recording until the feeding speed is reduced by said feeding speed control means during the feeding operation.

20. The information recording device according to claim 17, further comprising warning means for performing a warning operation when information recording is not complete at the second timing.

21. An information recording device for recording information on a recording medium comprising:

a recording medium feeding assembly that feeds the recording medium within the information recording device at a feeding speed during a feeding operation;

an information recording assembly that records information on the recording medium during the feeding operation;

a controller that determines whether information recording by said information recording assembly is complete before a first timing;

a feeding speed controller connected to said recording medium feeding assembly that controls said recording medium feeding assembly to reduce the feeding speed at the first timing when said controller determines that information recording is complete, wherein said feeding speed controller further controls said recording medium feeding assembly to reduce the feeding speed at a second timing after the first timing when said controller determines that information recording is not complete at the first timing, and wherein said feeding speed controller further controls said recording medium feeding assembly to stop feeding of the recording medium at a third timing after the feeding speed has been reduced; and a recording controller connected to said information recording assembly that controls the operation of said information recording assembly.

22. The information recording device according to claim 21, wherein said recording controller controls said information recording assembly such that information recording is started after detection of a stabilized feeding speed.

23. The information recording device according to claim 21, wherein said recording controller controls said information recording assembly to permit information recording until the feeding speed is reduced by said feeding speed controller during the feeding operation.

24. The information recording device according to claim 21, wherein said feeding assembly includes a power driving source for feeding the recording medium, and wherein said feeding speed controller reduces the film feeding speed by duty-driving said power driving source.

25. The information recording device according to claim 21, further comprising a warning assembly that performs a warning operation when information recording is not complete at the second timing.

26. The information recording device according to claim 21, wherein said information recording assembly includes:

a transformation unit that transforms the information to be recorded to recording signals having a predetermined frequency; and a recording unit to record the transformed recording signals to the information recording area of the film.

27. The information recording device according to claim 26, wherein said transformation unit increases the frequency of the recording signals at the first timing when said controller determines that information recording is not complete at the first timing.

28. The information recording device of a camera according to claim 21, wherein said information recording assembly includes a magnetic head to record the information on the recording medium.

29. A method of recording photographic information on a film having an information recording area using an information recording device including a film feeding assembly, an information recording assembly, a controller, a film feeding speed controller connected to the film feeding assembly and a recording controller connected to the information recording assembly, said method comprising the steps of:

feeding film at a film feeding speed with the film feeding assembly through the information recording device;

recording the photographic information on the information recording area of the film with the information recording assembly;

reducing the film feeding speed with the film speed controller when information recording is complete at a first timing;

reducing the film feeding speed at a second timing after the first timing when information recording is not complete at the first timing; and stopping film feeding at a third timing after the film feeding speed is reduced at the first or second timings.

30. The method according to claim 29, further comprising the step of detecting a stabilized film feeding speed with the controller before recording photographic information on the information recording area of the film.

31. The method according to claim 29, further comprising the step of stopping information recording by controlling the information recording assembly with the recording controller when the film feeding speed is reduced.

32. The method according to claim 29, further comprising the step of performing a warning operation when information recording is not complete at the second timing.

33. The method according to claim 29, wherein the step of recording the photographic information on the information recording area of the film includes transforming the photographic information to recording signals having a predetermined frequency.

34. The method according to claim 33, further comprising the step of increasing the frequency of the recording signals at the first timing when the controller determines that information recording is not complete at the first timing.

35. A method of recording information on a recording medium comprising the steps of:

feeding a recording medium at a recording medium feeding speed;

recording the information on the recording medium;

reducing the recording medium feeding speed when information recording is complete at a first timing;

reducing the recording medium feeding speed at a second timing after the first timing when information recording is not complete at the first timing; and stopping recording medium feeding at a third timing after the recording medium feeding speed is reduced at the first or second timings.

36. The method according to claim 35, further comprising the step of detecting a stabilized recording medium feeding speed before recording information on the recording medium.

37. The method according to claim 35, further comprising the step of stopping information recording when the recording medium feeding speed is reduced.

38. The method according to claim 35, further comprising the step of performing a warning operation when information recording is not complete at the second timing.

39. The method according to claim 35, wherein the step of recording information on the recording medium includes transforming the information to recording signals having a predetermined frequency.

40. The method according to claim 35, further comprising the step of increasing the frequency of the recording signals at the first timing when information recording is not complete at the first timing.

* * * * *